US008667096B2

(12) United States Patent
DeHaan et al.

(10) Patent No.: US 8,667,096 B2
(45) Date of Patent: Mar. 4, 2014

(54) AUTOMATICALLY GENERATING SYSTEM RESTORATION ORDER FOR NETWORK RECOVERY

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 976 days.

(21) Appl. No.: 12/395,493

(22) Filed: Feb. 27, 2009

(65) Prior Publication Data
US 2010/0220584 A1 Sep. 2, 2010

(51) Int. Cl.
*G06F 15/177* (2006.01)

(52) U.S. Cl.
USPC ........... 709/220; 709/203; 709/217; 709/223; 717/176

(58) Field of Classification Search
USPC .......... 709/220, 223, 203, 217, 226; 717/176, 717/178
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |
| 6,845,464 B2 | 1/2005 | Gold | |
| 6,865,737 B1 | 3/2005 | Lucas et al. | |
| 6,947,939 B2 | 9/2005 | Fujibayashi et al. | |
| 6,981,252 B1 * | 12/2005 | Sadowsky | 717/176 |

(Continued)

OTHER PUBLICATIONS

DeHaan, "Systems and Methods for Cloning Target Machines in a Software Provisioning Environment", U.S. Appl. No. 12/473,014, filed May 27, 2009.

(Continued)

*Primary Examiner* — Ramy Mohamed Osman
(74) *Attorney, Agent, or Firm* — Lowenstein Sandler LLP

(57) ABSTRACT

Embodiments relate to systems and methods for automatically generating a system restoration order for network recovery. A set of managed machines, such as personal computers or servers, can be managed by a network management platform communicating with the machines via a secure channel. The network management platform can access a dependency map indicating a required order for restoration of machines or nodes on a network. The network management platform likewise access a reverse kickstart file for each machine to be automatically restored in order to ensure proper functioning of the network, and extract a current configuration of that machine for purposes of restoring the overall network.

18 Claims, 6 Drawing Sheets

(56) References Cited

U.S. PATENT DOCUMENTS

| | | | |
|---|---|---|---|
| 6,986,033 B2 | 1/2006 | Miyamoto et al. | |
| 7,013,461 B2 | 3/2006 | Hellerstein et al. | |
| 7,051,101 B1 | 5/2006 | Dubrovsky et al. | |
| 7,107,330 B1 | 9/2006 | Hamilton et al. | |
| 7,133,822 B1 | 11/2006 | Jacobson | |
| 7,165,109 B2 | 1/2007 | Chiloyan et al. | |
| 7,185,071 B2 | 2/2007 | Berg et al. | |
| 7,200,845 B2 | 4/2007 | Morrison et al. | |
| 7,340,637 B2 | 3/2008 | Nagoya | |
| 7,350,112 B2 | 3/2008 | Fox et al. | |
| 7,356,679 B1 | 4/2008 | Le et al. | |
| 7,395,322 B2 | 7/2008 | Harvey et al. | |
| 7,506,040 B1 | 3/2009 | Rabe et al. | |
| 7,506,151 B2 | 3/2009 | Miyamoto et al. | |
| 7,516,218 B2 | 4/2009 | Besson | |
| 7,519,691 B2 | 4/2009 | Nichols et al. | |
| 7,574,481 B2 | 8/2009 | Moore et al. | |
| 7,586,839 B2* | 9/2009 | Childress et al. | 370/216 |
| 7,600,005 B2 | 10/2009 | Jamkhedkar et al. | |
| 7,606,868 B1 | 10/2009 | Le et al. | |
| 7,640,325 B1 | 12/2009 | DeKoning et al. | |
| 7,681,080 B2 | 3/2010 | Abali et al. | |
| 7,707,571 B1* | 4/2010 | Harris et al. | 717/176 |
| 7,716,316 B2 | 5/2010 | Nichols et al. | |
| 7,734,717 B2 | 6/2010 | Saarimaki et al. | |
| 7,827,261 B1 | 11/2010 | Griswold et al. | |
| 7,831,997 B2 | 11/2010 | Eldar et al. | |
| 7,937,437 B2 | 5/2011 | Fujii | |
| 7,962,590 B1* | 6/2011 | Or et al. | 709/223 |
| 7,983,927 B2* | 7/2011 | McGill et al. | 705/1.1 |
| 2002/0062259 A1 | 5/2002 | Katz et al. | |
| 2002/0078186 A1 | 6/2002 | Engel et al. | |
| 2002/0138567 A1 | 9/2002 | Ogawa | |
| 2002/0162028 A1 | 10/2002 | Kennedy | |
| 2003/0005097 A1 | 1/2003 | Barnard et al. | |
| 2003/0037327 A1* | 2/2003 | Cicciarelli et al. | 717/178 |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0110173 A1 | 6/2003 | Marsland | |
| 2003/0119480 A1 | 6/2003 | Mohammed | |
| 2003/0126585 A1 | 7/2003 | Parry | |
| 2003/0195921 A1 | 10/2003 | Becker et al. | |
| 2003/0212992 A1 | 11/2003 | Ronning et al. | |
| 2004/0006616 A1 | 1/2004 | Quinn et al. | |
| 2004/0015831 A1 | 1/2004 | Bowhill | |
| 2004/0015957 A1 | 1/2004 | Zara et al. | |
| 2004/0019876 A1 | 1/2004 | Dravida et al. | |
| 2004/0024984 A1 | 2/2004 | Lanzatella et al. | |
| 2004/0044643 A1 | 3/2004 | deVries et al. | |
| 2004/0054789 A1 | 3/2004 | Breh et al. | |
| 2004/0059703 A1 | 3/2004 | Chappell et al. | |
| 2004/0064501 A1 | 4/2004 | Jan et al. | |
| 2004/0128375 A1 | 7/2004 | Rockwell | |
| 2004/0143664 A1 | 7/2004 | Usa et al. | |
| 2004/0167975 A1 | 8/2004 | Hwang et al. | |
| 2004/0215755 A1 | 10/2004 | O'Neill | |
| 2004/0223469 A1 | 11/2004 | Bahl et al. | |
| 2005/0028025 A1 | 2/2005 | Zalewski et al. | |
| 2005/0028154 A1* | 2/2005 | Smith et al. | 709/223 |
| 2005/0050175 A1 | 3/2005 | Fong et al. | |
| 2005/0114474 A1 | 5/2005 | Anderson et al. | |
| 2005/0125525 A1 | 6/2005 | Zhou et al. | |
| 2005/0177829 A1 | 8/2005 | Vishwanath | |
| 2005/0182796 A1 | 8/2005 | Chu et al. | |
| 2005/0198629 A1 | 9/2005 | Vishwanath | |
| 2005/0223374 A1 | 10/2005 | Wishart et al. | |
| 2006/0041767 A1 | 2/2006 | Maxwell et al. | |
| 2006/0080659 A1 | 4/2006 | Ganji | |
| 2006/0095230 A1 | 5/2006 | Grier et al. | |
| 2006/0095702 A1 | 5/2006 | Hickman et al. | |
| 2006/0136526 A1* | 6/2006 | Childress et al. | 707/205 |
| 2006/0136903 A1* | 6/2006 | Childress et al. | 717/172 |
| 2006/0155857 A1 | 7/2006 | Feenan et al. | |
| 2006/0173912 A1 | 8/2006 | Lindvall et al. | |
| 2006/0174018 A1 | 8/2006 | Zhu et al. | |
| 2006/0190575 A1 | 8/2006 | Harvey et al. | |
| 2006/0190773 A1 | 8/2006 | Rao et al. | |
| 2006/0200658 A1 | 9/2006 | Penkethman | |
| 2006/0215575 A1 | 9/2006 | Horton et al. | |
| 2006/0218544 A1 | 9/2006 | Chakraborty et al. | |
| 2006/0230165 A1 | 10/2006 | Zimmer et al. | |
| 2006/0282479 A1* | 12/2006 | Johnson et al. | 707/203 |
| 2007/0015538 A1 | 1/2007 | Wang | |
| 2007/0067419 A1 | 3/2007 | Bennett | |
| 2007/0079004 A1* | 4/2007 | Tatemura et al. | 709/238 |
| 2007/0101118 A1 | 5/2007 | Raghunath et al. | |
| 2007/0118654 A1 | 5/2007 | Jamkhedkar et al. | |
| 2007/0168721 A1 | 7/2007 | Luiro et al. | |
| 2007/0169093 A1 | 7/2007 | Logan et al. | |
| 2007/0192158 A1 | 8/2007 | Kim | |
| 2007/0204338 A1 | 8/2007 | Aiello et al. | |
| 2007/0226810 A1 | 9/2007 | Hotti | |
| 2007/0244996 A1 | 10/2007 | Ahmed et al. | |
| 2007/0276905 A1 | 11/2007 | Durand et al. | |
| 2007/0288612 A1 | 12/2007 | Hall | |
| 2007/0294376 A1 | 12/2007 | Ayachitula et al. | |
| 2007/0299951 A1 | 12/2007 | Krithivas | |
| 2008/0028048 A1 | 1/2008 | Shekar Cs et al. | |
| 2008/0040452 A1 | 2/2008 | Rao et al. | |
| 2008/0046708 A1 | 2/2008 | Fitzgerald et al. | |
| 2008/0059959 A1 | 3/2008 | Chen et al. | |
| 2008/0130639 A1 | 6/2008 | Costa-Requena et al. | |
| 2008/0189693 A1 | 8/2008 | Pathak | |
| 2008/0196043 A1 | 8/2008 | Feinleib et al. | |
| 2008/0235266 A1 | 9/2008 | Huang et al. | |
| 2008/0235361 A1 | 9/2008 | Crosbie et al. | |
| 2008/0244325 A1 | 10/2008 | Tyulenev | |
| 2008/0270674 A1 | 10/2008 | Ginzton | |
| 2008/0288938 A1 | 11/2008 | DeHaan | |
| 2008/0288939 A1 | 11/2008 | DeHaan | |
| 2008/0294777 A1 | 11/2008 | Karve et al. | |
| 2008/0301666 A1 | 12/2008 | Gordon et al. | |
| 2008/0313716 A1 | 12/2008 | Park | |
| 2008/0320110 A1 | 12/2008 | Pathak | |
| 2009/0007091 A1 | 1/2009 | Appiah et al. | |
| 2009/0055901 A1 | 2/2009 | Kumar et al. | |
| 2009/0064132 A1 | 3/2009 | Suchy et al. | |
| 2009/0089567 A1 | 4/2009 | Boland et al. | |
| 2009/0089852 A1 | 4/2009 | Randolph et al. | |
| 2009/0106291 A1 | 4/2009 | Ku et al. | |
| 2009/0129597 A1 | 5/2009 | Zimmer et al. | |
| 2009/0132682 A1 | 5/2009 | Counterman | |
| 2009/0132710 A1 | 5/2009 | Pelley | |
| 2009/0158148 A1 | 6/2009 | Vellanki et al. | |
| 2009/0158272 A1 | 6/2009 | El-Assir et al. | |
| 2009/0164522 A1 | 6/2009 | Fahey | |
| 2009/0165099 A1 | 6/2009 | Eldar et al. | |
| 2009/0172430 A1 | 7/2009 | Takenouchi | |
| 2009/0240835 A1 | 9/2009 | Adelman et al. | |
| 2009/0259665 A1 | 10/2009 | Howe et al. | |
| 2009/0265707 A1 | 10/2009 | Goodman et al. | |
| 2009/0282404 A1 | 11/2009 | Khandekar et al. | |
| 2009/0285199 A1 | 11/2009 | Strahs et al. | |
| 2010/0023740 A1 | 1/2010 | Moon et al. | |
| 2010/0049838 A1 | 2/2010 | DeHaan | |
| 2010/0050169 A1 | 2/2010 | DeHaan | |
| 2010/0054156 A1 | 3/2010 | DeHaan | |
| 2010/0057833 A1 | 3/2010 | DeHaan | |
| 2010/0057890 A1 | 3/2010 | DeHaan | |
| 2010/0057913 A1 | 3/2010 | DeHaan | |
| 2010/0057930 A1 | 3/2010 | DeHaan | |
| 2010/0058307 A1 | 3/2010 | DeHaan | |
| 2010/0058327 A1 | 3/2010 | DeHaan | |
| 2010/0058328 A1 | 3/2010 | DeHaan | |
| 2010/0058330 A1 | 3/2010 | DeHaan | |
| 2010/0058332 A1 | 3/2010 | DeHaan | |
| 2010/0058444 A1 | 3/2010 | DeHaan | |
| 2010/0082799 A1 | 4/2010 | DeHaan et al. | |
| 2010/0083245 A1 | 4/2010 | DeHaan et al. | |
| 2010/0100876 A1 | 4/2010 | Glover et al. | |
| 2010/0128639 A1 | 5/2010 | DeHaan et al. | |

(56) References Cited

U.S. PATENT DOCUMENTS

| | | |
|---|---|---|
| 2010/0131648 A1 | 5/2010 | DeHaan |
| 2010/0138521 A1 | 6/2010 | DeHaan et al. |
| 2010/0138526 A1 | 6/2010 | DeHaan et al. |
| 2010/0138696 A1 | 6/2010 | DeHaan et al. |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0223367 A1 | 9/2010 | DeHaan |
| 2010/0223504 A1 | 9/2010 | DeHaan et al. |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |

OTHER PUBLICATIONS

DeHaan, "Systems and Methods for Providing Configuration Management Services from a Provisioning Server", U.S. Appl. No. 12/414,941, filed Mar. 31, 2009.

DeHaan, "Systems and Methods for Retiring Target Machines by a Provisioning Server", U.S. Appl. No. 12/475,427, filed May 29, 2009.

DeHaan, "Systems and Methods for Message-Based Installation Management Using Message Bus", U.S. Appl. No. 12/495,077, filed Jun. 30, 2009.

Henson, "Systems and Methods for Integrating Storage Resources from Storage Area Network in Machine Provisioning Platform", U.S. Appl. No. 12/628,041, filed Nov. 30, 2009.

Henson, "Systems and Methods for Mounting Specified Storage Resources from Storage Area Network in Machine Provisioning Platform", U.S. Appl. No. 12/627,988, filed Nov. 30, 2009.

Doc Searls "Linux for Suits", 2005, Specialized System Consultants Inc., vol. 2005.

EBook "Microsoft System Management Server 2003 Administrator's companion", Microsoft Press, c2004, Ch. 13, Patch Management, pp. 471-507.

Butt et al., "Automated Installation of Large-Scale Linux Networks", 2000.

Agarwalla, "Automating Provisioning of Complete Software Stack in a Grid Environment", 2004.

Anderson et al., "Technologies for Large-Scale Configuration Management", Dec. 9, 2002.

Grosse, "Repository Mirroring", 1995.

HP Storage Essentials SRM 6.0 Installation Guide. Jan. 2008. HP. 1st ed. Part No. T4238-96113. pp. 1-5, 97-136, 219-228.

HP Storage Essentials SRM 6.0 User Guide. Jan. 2008. HP. 1st ed. Part No. T4238-96114. pp. 1-83.

Michael DeHaan, "Unfiled Provisioning", 2007.

Michael DeHaan. "Provisioning With Cobbler". 2007.

Tan et al. "A WBEM Basked Disk Array Management Provider", 2005. IEEE. 2005 International Conference on Cyberworlds.

Lovelace et al. Managing Disk Subsystems using IBM TotalStorage Productivity Center. Sep. 2005. IBM. 2nd ed. SG24-7097-01. pp. 1-42.

* cited by examiner

AUTOMATICALLY GENERATING SYSTEM RESTORATION ORDER FOR NETWORK RECOVERY

FIELD

The present teachings relate to systems and methods for automatically generating system restoration order for network recovery.

BACKGROUND OF RELATED ART

Network management platforms exist which permit a systems administrator to connect to a set of targets in a network, and perform maintenance and diagnostic activities on that group of managed machines. The network management platform can identify individual targets via a public key or other security credential, and identify the software provisioning requirements, obtain a hardware inventory, or perform other management tasks on validated machines. In general, existing network management platforms can be hosted on a central server or other facility that permits connection to, identification, and management of the set of targets.

In terms of the maintenance of machines populated on a network as well as the maintenance of the network on a comprehensive basis, systems administrators from time to time may need to take stock of individual machines and their network relationships. The managed network may need to be interrogated to determine installation configurations and network interconnections, for instance, to prepare for the possible restoration of the network or individual machines in the event of a crash, intrusion, disaster, or other unforeseen hazard.

Existing network management platforms suffer from various limitations of design and function, however, in terms of their ability to manage any low-level or high-level restoration process. For one, in the event of the failure of multiple servers, clients, or other nodes or machines, existing platforms are not equipped to identify the software dependencies of one machine on another. For instance, where one server supports a Web page for commercial online customers whose accounts are stored in a second remote database, it may be necessary to restore the database server first, before the Web server, to ensure account data can be retrieved using that networked software or service. Besides crash recovery, the ability to identify software-related dependencies would also prove useful for security management purposes, if that capability were available.

For further instance, in the case of the corruption or loss of individual machines, the particular configuration of those machines can be difficult or impossible to restore using existing network management platforms. While individual "kickstart" files reflecting initial configuration states can be received from targets or other machines during installation, those files can be lost or damaged in existing network management platforms, which have no facility for managing such files. Kickstart files can, in general, include any type of installation answer file, such as, for instance, JumpStart, AutoYast, preseed, or other files or protocols. In further regards, existing network management platforms or provisioning platforms provide no integrated tool to attempt the restoration of an entire datacenter or network, including all individual nodes and taking software dependency into account. Thus, there is a need in the art for methods and systems that provide centralized management of restoration and related operations.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for automatically generating a system restoration order for network recovery. More particularly, embodiments relate to platforms and techniques for accessing a dependency map to identify an ordered list of nodes for restoration of a network, based on the dependency of software or services installed on the set of machines in a managed network. As each machine is processed in order for restoration, a network management platform can extract a reverse kickstart file to re-install a set of software and/or other resources to the current configuration of that node. An entire network or datacenter can therefore be automatically be restored in an order that preserves proper function of the network and its nodes.

Reference will now be made in detail to exemplary embodiments of the present teachings, which are illustrated in the accompanying drawings. Where possible the same reference numbers will be used throughout the drawings to refer to the same or like parts.

Figure 1:
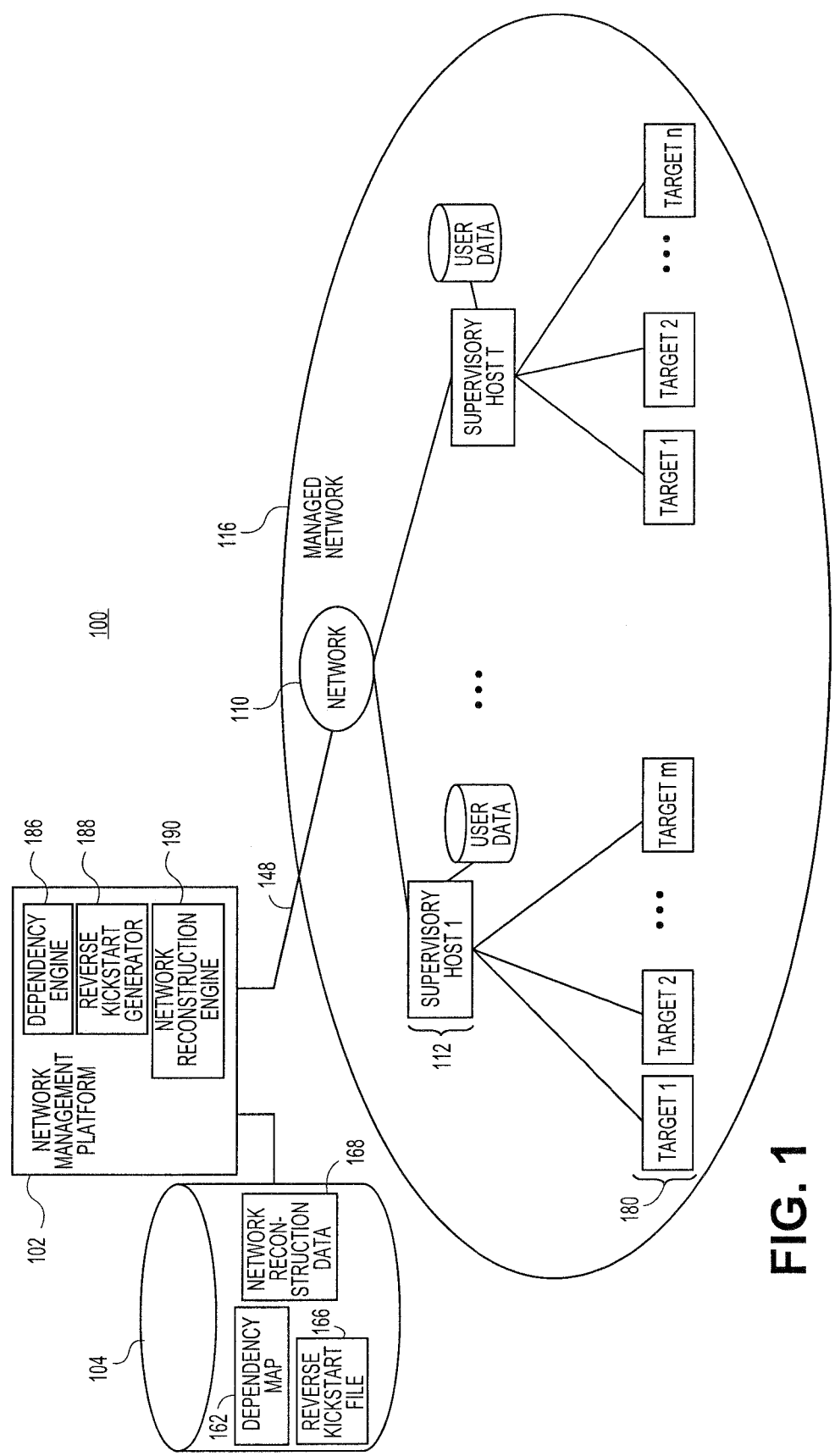
FIG. 1 illustrates an overall network in which systems and methods for automatically generating a system restoration order for network recovery can be practiced, according to various embodiments of the present teachings.

FIG. 1 illustrates an overall system 100 in which systems and methods for automatically generating system restoration order for network recovery can be implemented, according to various embodiments of the present teachings. In embodiments as shown, network management platform 102 can communicate with managed network 116 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. patent application Publication No. 20090300180, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. Managed network 116 can include, as shown, a set of supervisory hosts 112, a set of targets 180, and/or other machines, devices, clients, and/or other hardware, software, storage or other resources.

While secure channel 148 is illustratively shown as one channel to managed network 116 or devices therein, it will be understood that in embodiments, secure channel 148 can comprise multiple channels or connections. In embodiments, secure channel 148 can instead be replaced by a non-secure channel or connection. In general, network management platform 102 can communicate with the managed network 116 and its constituent machines and resources, which can for instance comprise personal computers, servers, network-enable devices, virtual machines, and/or other devices, and manage the security of those machines under the supervision of network management platform 102. The network management platform 102 can host a set of engines, logic, and/or other resources to interrogate managed network 116 and identify software dependencies, reverse kickstart files, and/or network-wide restoration data or policies to manage the tracking, backup, and restoration of managed network 116 and/or its constituent nodes, machines, and resources. Network management platform 102 can, in embodiments as shown, host engines or logic including dependency engine 186, reverse kickstart generator 188, and network reconstruction engine 190. Network management platform 102 can communicate with network store 104 to establish, maintain and store dependency map 162, set of reverse kickstart files 166, and network reconstruction data 168. Other logic and data stores can be used.

The network management platform 102 can also for instance establish a set of security policies for managed machines in its domain, including for example an access control list (ACL) and/or other policies, lists, or parameters for the maintenance and management of managed network 116. Security policies and other data can for instance be stored in network store 104.

Network management platform 102 can establish secure connection 148 or other connection to managed network 116, and conduct network scanning, backup and restoration operations, according to various embodiments described herein.

Figure 2:
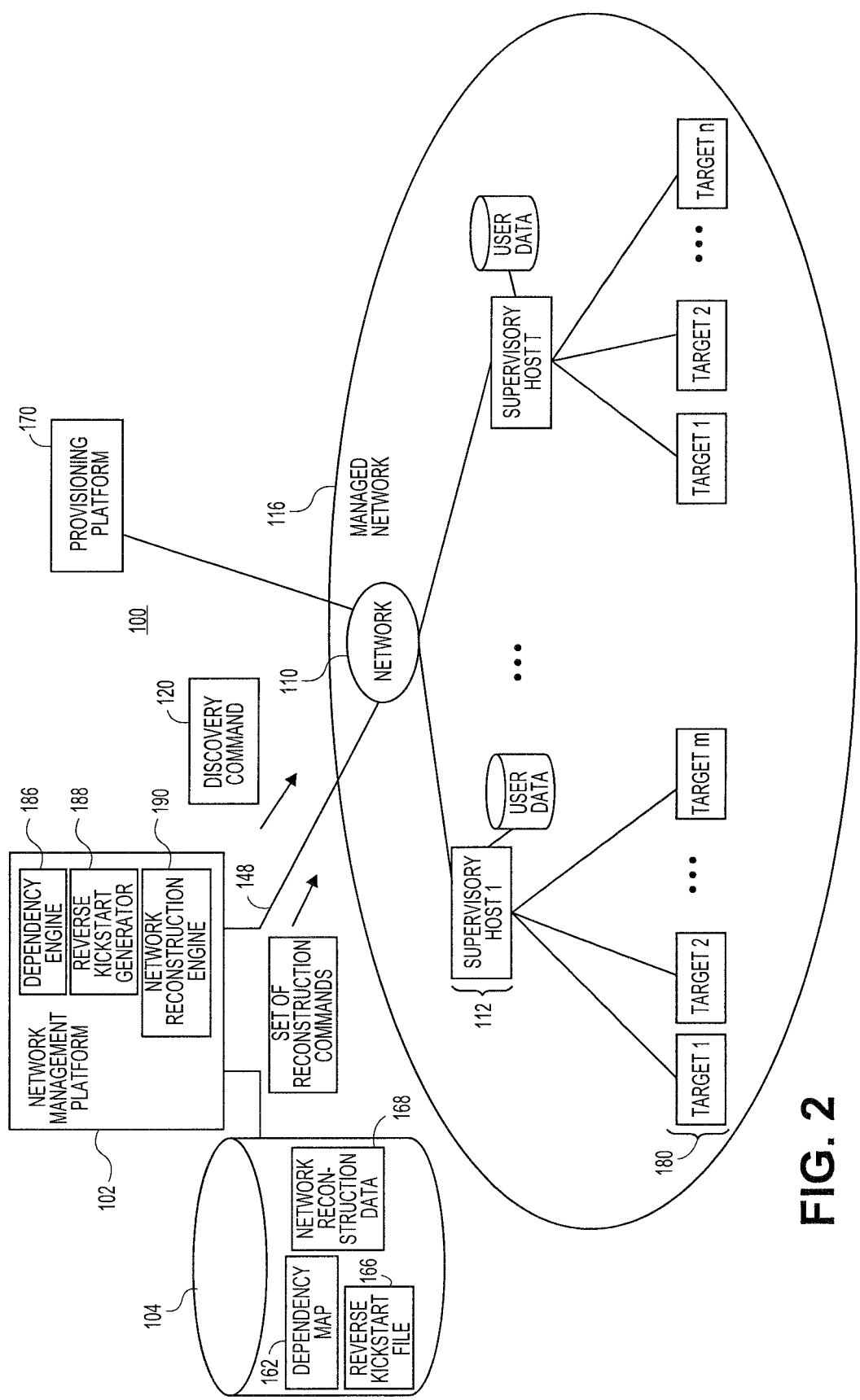
FIG. 2 illustrates an overall network in which systems and methods for automatically generating a system restoration order for network recovery can be practiced to various embodiments of the present teachings, including transmission of data files.

According to embodiments in one regard, network management platform 102 can operate to connect to a given one or more of managed network 116 to probe managed network 116 for software-based dependencies in two or more nodes in the network. As for example more particularly shown in FIG. 2, network management platform 102 can host a dependency engine 186 to interrogate managed network 116 and identify software-based dependencies amongst targets, hosts, and/or other nodes in managed network 116. Dependency engine 186 can for instance issue one or more discovery command 120 to cause set of targets 180, set of supervisory hosts 112, and/or other nodes in managed network 116 to report applications or other software or services with which those nodes communicate, for instance to receive input or initiate services. According to various embodiments, one or more discovery command 120 can probe for, request, and transmit various types of data to dependency engine 186 to generate dependency map 162 based on the responses from nodes in managed network 116. One or more discovery command 120 can, for instance, probe for reports on virtual hosts and guests, including what virtual process runs on what node or machine. One or more discovery command 120 can likewise probe for reports on which nodes or machines have which other machines in an SSH (Secure Shell protocol) authorized keys file, and/or which targets in set of targets 180 may have received authentication to communicate with/act as a local supervisory node to other low-level targets. One or more discovery command 120 can, for instance, probe for reports on what configuration files indicate that network services, such as, for instance, sendmail, dns, syslog, or other services, reference other nodes or machines. One or more discovery command 120 can, for yet further instance, probe for reports on what network connections are present in a given node or machine, analogous to a "netstat-a-n" command. Other commands, requests, reports, or other probes can be used.

After receiving responses to one or more discovery command 120, network management platform 102 can build dependency map 162 encoding the software-based dependencies between set of target 180, set of supervisory hosts 112, and/or other nodes in managed network 116. Dependency map 162 can, for example, be configured as an ordered list, a tree, a graph, a database, a spreadsheet, and/or other data structure or coding. Dependency map 162 can encode relationships between software, services, and/or nodes of managed network 116, for instance to record that "Software Application A running on node 44 requires Software Application B running on node 32," or other orderings or relations. According to embodiments in further regards, network management platform 102 can thereby access dependency map 162 and reconstruct an ordered set of software installations and/or machine re-initializations to be carried out after an interruption in managed network 116, such as a physical disaster, security intrusion, or other event. Network management platform 102 can also operate on dependency map 162 to examine managed network 116 for security, configuration or issues, and/or carry out cloning operations for any nodes in the network, or the network itself. Because necessary relations between software, services and/or nodes can be effectively encoded in dependency map 162, software restoration in a logically necessary order can be generated at any needed time, enhancing the security and reliability of managed network 116. According to embodiments in further regards, network management platform 102 can operate to connect to managed network 116 and extract or build a reverse kickstart file 166, as also for instance illustrated in FIG. 2.

In embodiments as shown, network management platform 102 can issue one or more discovery commands 120 to locate any original kickstart files generated during an installation or initialization process for any node of managed network 116. The kickstart files which one or more discovery commands 120 seek out can be kickstart files and related data such as that described in co-pending U.S. patent application Ser. No. 11/763,315, U.S. patent application Publication No. 20080288938 and U.S. patent application Ser. No. 11/763,333, U.S. patent Publication No. 20080288939, the disclosures of which are incorporated herein, in their entirety, by reference. According to various embodiments, network management platform 102 can locate any kickstart file copied by the installer and perform other operations using reverse kickstart generator 188, or other logic. If present, in embodiments "/root/anaconda.ks can be used as a base point to locate any kickstart files. Network management platform 102 can further access a package management tool or application programming interfaces (APIs), such as "rpm-va" or yum-based protocols, to determine what files that were originally present in installation packages have been user-modified. If user-modified files are found, those files can be embedded in reverse kickstart file 166, which in embodiments can be stored to "% post" or other locations. Network management platform 102 can further scan managed network, for instance using available storage APIs, to detect mounted file systems in a subject node and regenerate a new section of reverse kickstart file 166 that represents the storage section of the installation. This section can, in embodiments, replace the section in the original kickstart file whose image is being extracted. In embodiments, network mounted file systems can also be detected, and for instance stored to "% post" or other locations.

In embodiments, network management platform can likewise embed/include any authorized keys in the reverse kickstart file 166, as well as any files not controlled by a package management tool. In embodiments, instead of embedding/including said files in reverse kickstart file 166, that data can be stored to a backup system (such as, for example, bacula or rdiff-backup) and be made to include in the reverse kickstart file 166 the paths/commands needed to restore them. Once the reverse kickstart file 166 is generated, it can then be used stand alone or with a provisioning platform 170 to recreate the systems, in current configurations, from scratch, effectively automatically reverse engineering their configuration from their current state. The systems administrator can later adjust the reverse kickstart file 166 as needed to begin maintaining and updating captured systems via that mechanism, or use that resource to clone or restore more systems as needed, for instance for disaster recovery purposes. In embodiments, the reverse kickstart file 166 and associated processes can be used to clone a network or datacenter, by effectively mirroring a set of machines to a new location. Other uses are possible.

According to embodiments in one regard, network management platform 102 can operate to connect to a given one or more of managed network 116 to generate a reconstruction of managed network 116 in the event of a significant or large-scale network malfunction, intrusion, or disaster. As for example also more particularly shown in FIG. 2, network management engine 102 can host network reconstruction engine 190 communicating with network reconstruction data 168 to perform an ordered restoration of a portion or all of managed network. In embodiments as shown, network reconstruction engine 190 can incorporate and/or access both reverse kickstart files and software dependency mappings as described herein, to perform a comprehensive or large-sale restoration of managed network 116 in a logically structured physical order. In embodiments, network management engine 102 via network reconstruction engine 190 can operate to generate a set of reconstruction commands 172 by accessing dependency map 162, reverse kickstart file 166, network reconstruction data 168, and/or other data or resources. In embodiments, the network reconstruction engine 190 can access dependency map 162, and identify a set of ordered nodes to restore to managed network 116. For each node, network reconstruction engine 190 can access a reverse kickstart file 166 or other source to re-provision the software resources of that node, or otherwise restore that node to managed network 116. Some or all of the restoration or re-provisioning of the nodes of managed network 116 can be performed by a provisioning platform 170, such as that described in the aforementioned in co-pending U.S. patent application Ser. No. 11/763,315, U.S. patent application Publication No. 20080288938 and U.S. patent application Ser. No. 11/763,333, U.S. patent Publication No. 20080288939, or other platforms or systems. In embodiments, files for restoration can be served from a backup server or system, if file sizes dictate. Once a network-wide or complete datacenter restoration has been performed in dependency or other order, network management platform 102 can execute one or more validation or debugging tests, using for example a secure connection and related resources such as those described in the afore-mentioned U.S. application Ser. No. 12/130,424, filed May 30, 2008, entitled "Systems and Methods for Remote Management of Networked Systems Using Secure Modular Platform," which published as U.S. patent application Publication No. 20090300180. Other network management platforms or systems can be used.

Figure 3:
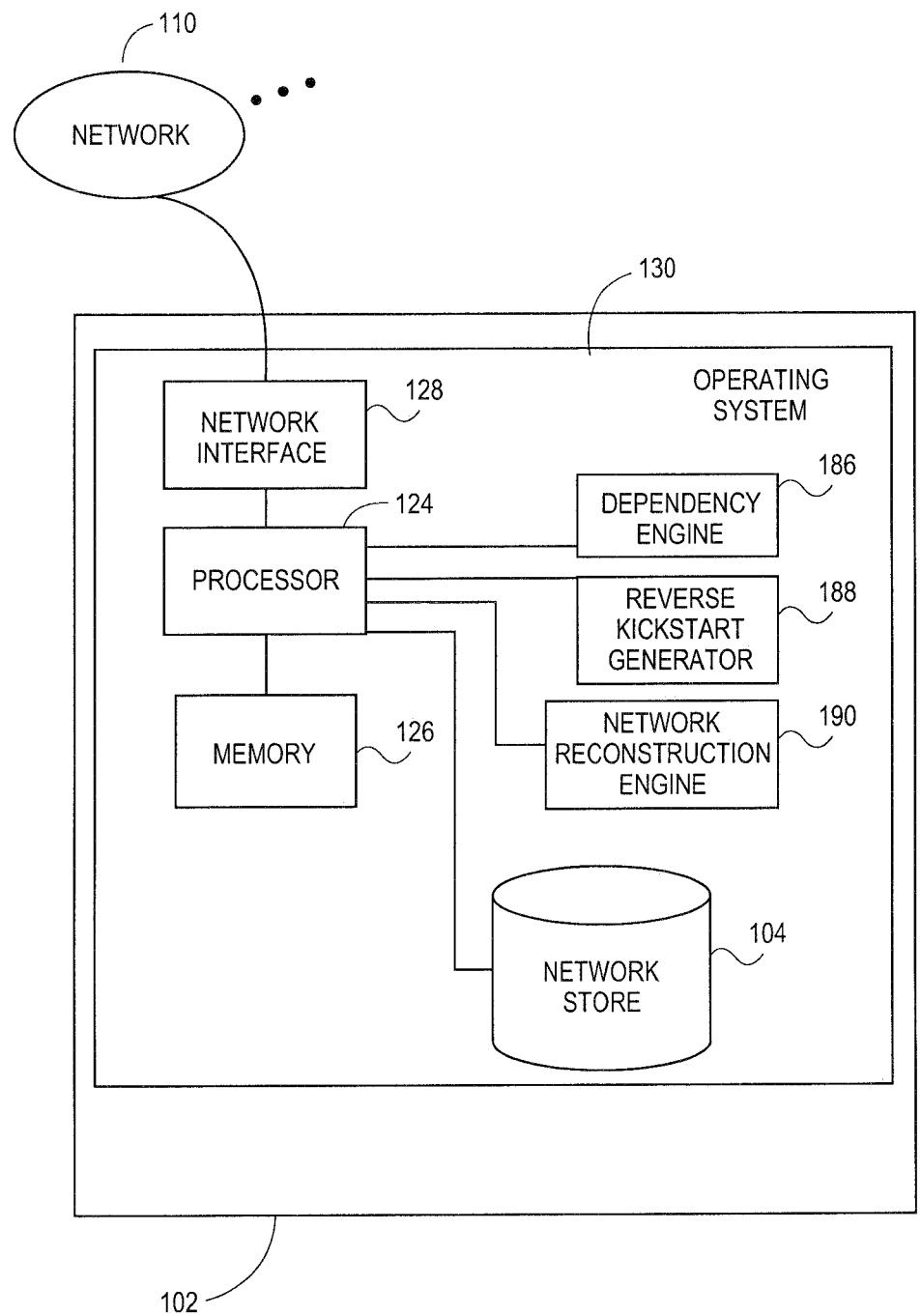
FIG. 3 illustrates an illustrative hardware configuration which can support systems and methods for automatically generating system restoration order for network recovery according to various embodiments of the present teachings.

FIG. 3 illustrates an exemplary diagram of hardware and other resources that can be incorporated in a network management platform 102 configured to communicate with managed network 116 and/or other resources, according to embodiments. In embodiments as shown, the network management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with dependency engine 186, reverse kickstart generator 188, and network reconstruction engine 190, to execute control logic and perform management and restoration processes described herein. Other configurations of the network management platform 102, associated network connections, and other hardware and software resources are possible. While FIG. 3 illustrates network management platform 102 as a standalone system comprises a combination of hardware and software, network management platform 102 can also be implemented as a software application or program capable of being executed by a conventional computer platform. Likewise, network management platform 102 can also be implemented as a software module or program module capable of being incorporated in other software applications and programs. In either case, network management platform 102 can be implemented in any type of conventional proprietary or open-source computer language.

Figure 4:
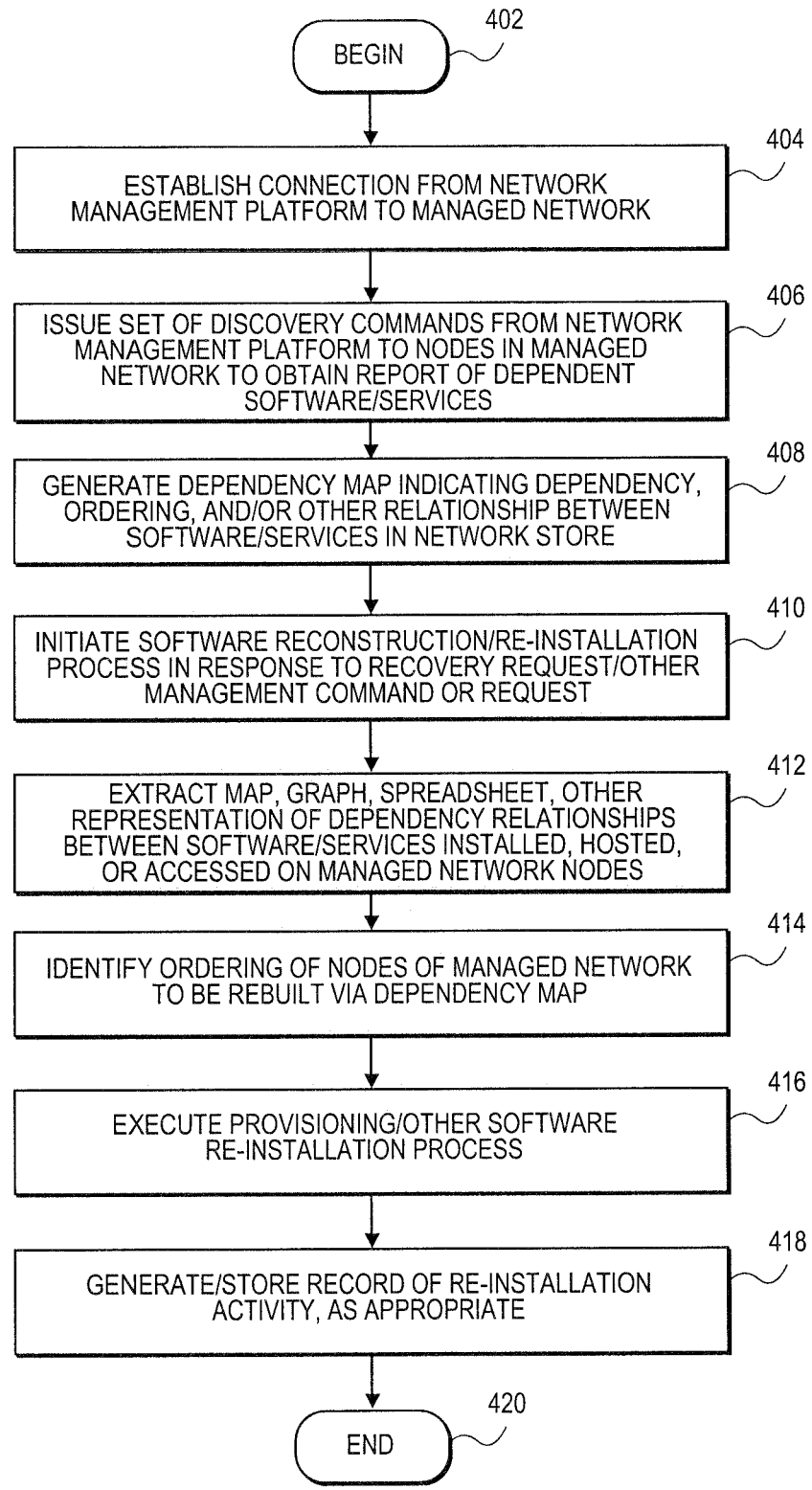
FIG. 4 illustrates a flowchart for software dependency processing, according to various embodiments of the present teachings.

FIG. 4 illustrates a flowchart of processing to manage software dependency and network restoration, according to various embodiments. In 402, processing can begin. In 404, a secure connection 148 or other connection(s) can be established from network management platform 102 to managed network 116. In 406, one or more discovery command 120 can be issued from network management platform 102 to hosts, targets, and/or other nodes in managed network 116 to obtain a report of software and/or services upon which each node depends or requires. In 408, network management platform 102 can generate a dependency map 162 indicating the dependency order of relationship between each node and/or its software complement and other nodes and their software complement in managed network 116. Dependency map 162 can be generated, for example, in the form of an ordered list of nodes and/or applications or other software, a tree, a linked list, a graph, a spreadsheet, a database, and/or other data structure. In 410, network management platform 102 can initiate a software reconstruction, re-installation, recovery, or other provisioning or installation process on managed network 116. In 412, network management platform 102 can extract a map, graph, spreadsheet, or other representation or encoding of dependency relationships between nodes in managed network 116 and/or the software, services and/or other resources or processes installed, hosted, or accessed on nodes of managed network 116. In 414, network management platform 102 and/or other logic can identify an ordering or other relationship of the nodes of managed network 116 to be rebuilt or re-installed using dependency map 162 and/or other data. In 416, a re-provisioning or other software re-installation process can be executed on managed network 116, for instance, to provision or install operating systems, applications, data, services, and/or other software to nodes of managed network 118. In 418, a record of the re-installation activity can be generated and/or stored, as appropriate. In 420, as understood by persons skilled in the art, processing can repeat, return to a prior processing point, jump to a further processing point, or end.

Figure 5:
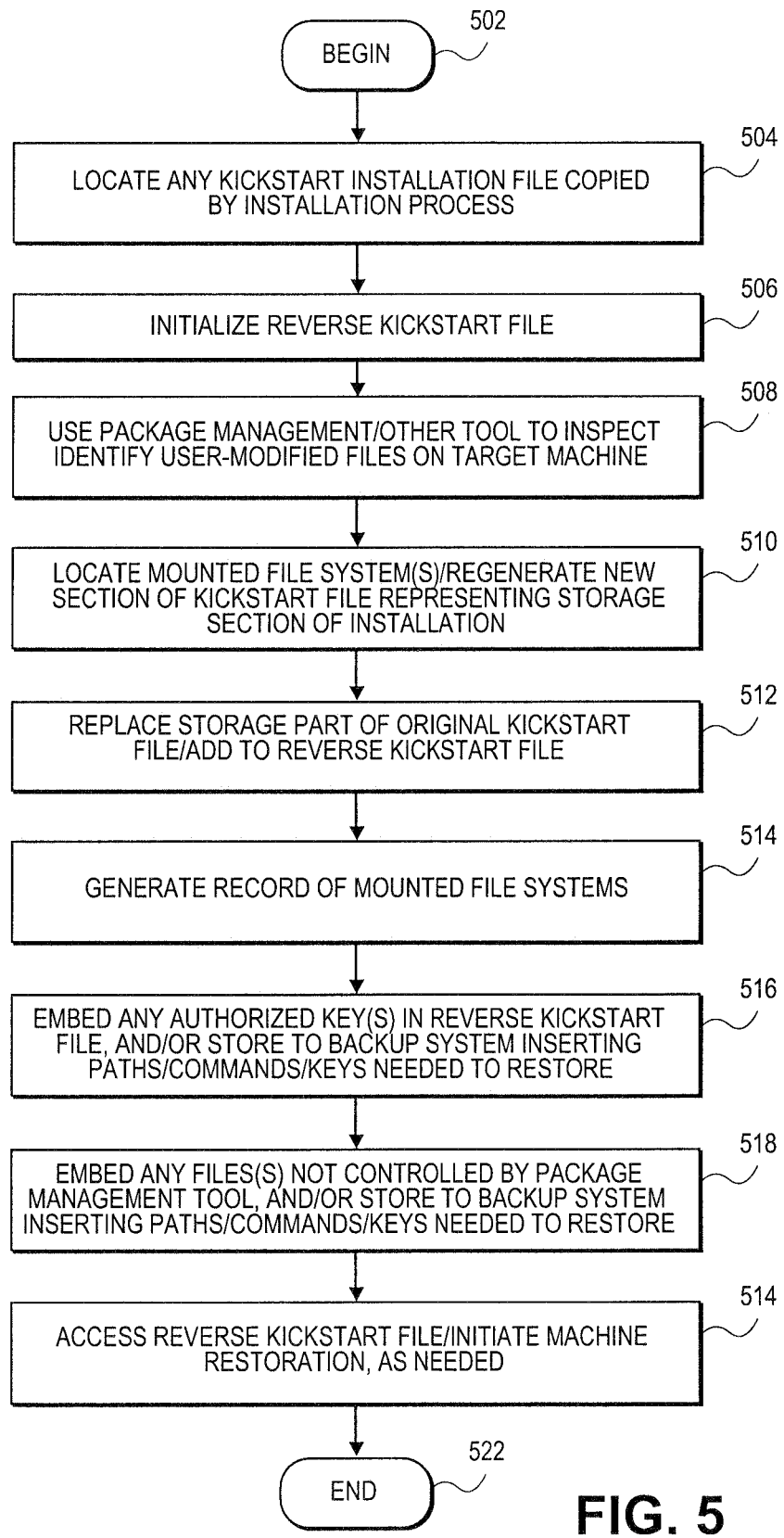
FIG. 5 illustrates a flowchart of generation of a reverse kickstart file, according to various embodiments of the present teachings.

FIG. 5 illustrates a flowchart of processing to manage the generation of a reverse kickstart or other reverse installation file, according to various embodiments. In 502, processing can begin. In 504, network management platform 102 can search managed network 116 to locate any kickstart or other installation file left over or copied by an installation process on nodes of managed network 116. In 506, a reverse kickstart file 166 can be created/initialized. In 508, network management platform 102 can use a package management tool and/or other tool or resource to inspect/identify any user-modified files located on the target machine or other node for which a reverse kickstart file 166 or other reverse installation file is being generated.

In 510, network management platform 102 can located a mounted file system(s) and regenerate a new section of the kickstart file representing a storage section of the installation. In 512, the storage part of the original installation file can be replaced, and/or added or inserted in reverse kickstart file 166. In 514, network management platform 102 can generate a record of mounted file systems on the node associated with reverse kickstart file 166. In 516, any authorized keys or other security credentials from the subject node can be embedded in reverse kickstart file 166, and/or the security data can be stored to a backup system in which the security data along with paths, commands, and/or keys needed to restore the node can be inserted. In 518, any files not detected or controlled by the package management tool used by network management platform 102 can be embedded reverse kickstart file 166, or those files can be stored to a backup system in which those files along with paths, commands, and/or keys needed to restore the node can be inserted. In 520, the network management platform 102 can access reverse kickstart file 166 and initiate a machine restoration process for one or more nodes in managed network 116, as appropriate. In 522, as understood by persons skilled in the art, processing can repeat, return to a prior processing point, jump to a further processing point, or end.

Figure 6:
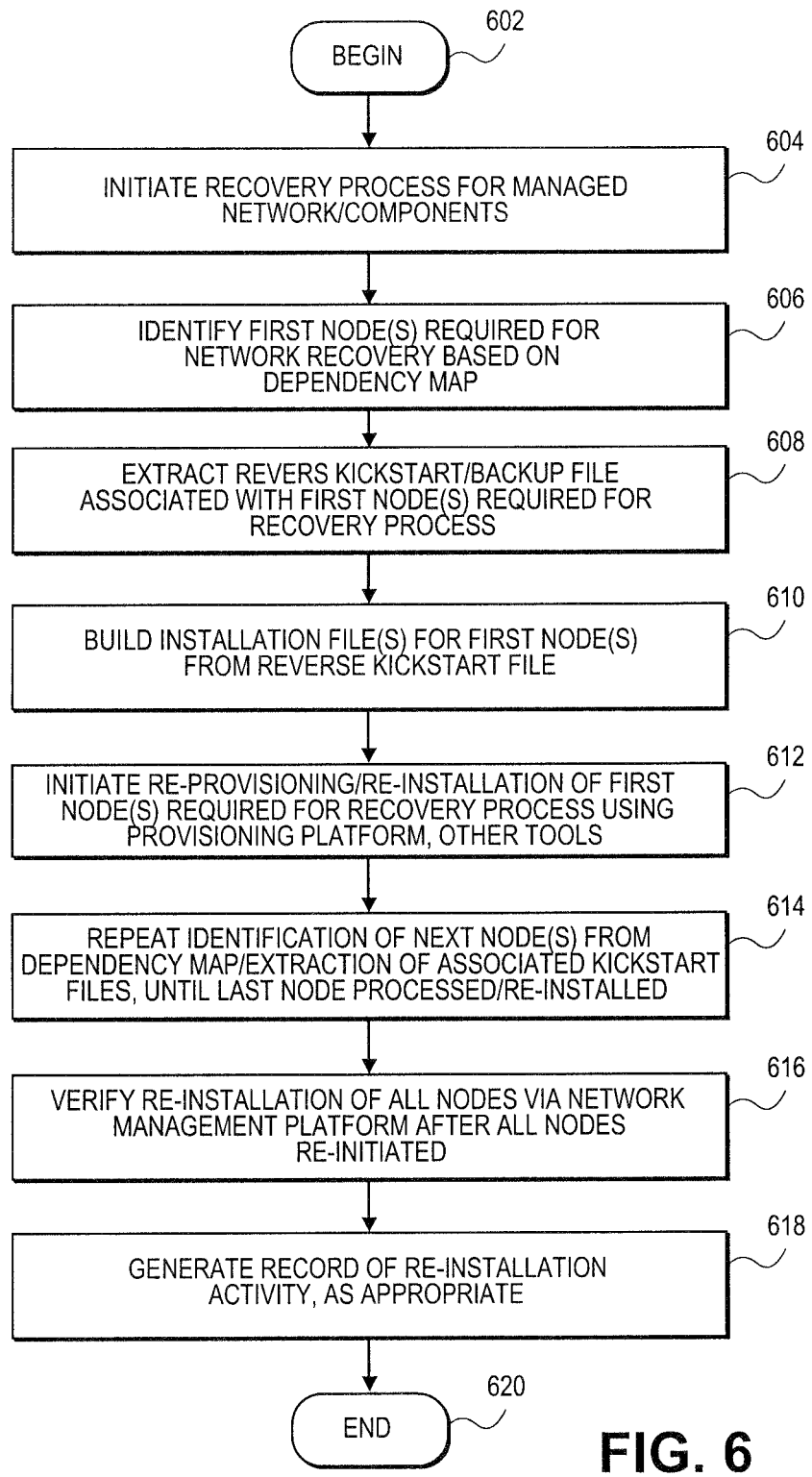
FIG. 6 illustrates a flowchart of generating a network-scale restoration in controlled physical order, according to various embodiments of the present teachings.

FIG. 6 illustrates a flowchart of processing to perform network-scale restoration, according to various embodiments. In 602, processing can begin. In 604, a recovery process for a managed network 116 and its components, and/or other datacenter entity can be initiated. In 606, a first node or nodes required for network recovery can be identified based on dependency map 166, for instance, by identifying the lowest/highest node in managed network 116 required by other nodes. In 608, a reverse kickstart file 166 and/or other backup files or data associated with the first required node(s) can be extracted from network store 104 or other location. In 610, network management platform 102 can build installation file(s) for the first required node(s) can be built from reverse kickstart file 166 and/or other data.

In 612, the re-provisioning or re-installation of the first required node(s) can be initiated using a provisioning platform 170 and/or other tools or resources. In embodiments, provisioning platform 170 and related processes can be or include those described in the aforementioned copending U.S. patent application Ser. No. 11/763,315, U.S. patent application Publication No. 20080288938 and U.S. patent application Ser. No. 11/763,333, U.S. patent Publication No. 20080288939. In 614, the identification of a next required node(s) based on dependency map 162 can be begun/repeated, and the extraction of associated reverse kickstart file 166 can be begun/repeated, until the last node of managed network 116 is processed/re-installed. In 616, the re-installation of all nodes recovered in managed network 116 can be verified via network management platform 102 after all nodes have been processed. In 618, network management platform 102 can generate a record of re-installation or recovery activity, as appropriate. In 620, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single network management platform 102 manages and maintains managed network 116, in embodiments, multiple engines, servers, or other entities can cooperate to perform network management functions. For further example, while embodiments have been described in which restoration, dependency, and/or other operations can be performed on a single host or target, in embodiments, multiple diagnostic targets or an entire group of managed machines can be operated on at one time or together. Other resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method comprising:
    accessing, by a processing device, a dependency map for a set of nodes on a network, the dependency map encoding a dependency relationship between programs installed on nodes in the set of nodes;
    accessing a separate associated reverse automatic installation file for each node in the set of nodes represented in the dependency map, the reverse automatic installation file encoding data hosted on each respective node;
    generating, via a provisioning server, a provisioning installation for each of the nodes from the separate associated reverse automatic installation file for each of the nodes; and
    validating a network restoration using a validation process performed via a network management platform.

2. The method of claim 1, wherein the dependency map comprises a set of ordered links between nodes in the network based on a first set of software generating output or services used as inputs to a second set of software.

3. The method of claim 1, wherein the dependency map is generated via a network management platform issuing a set of discovery commands.

4. The method of claim 1, wherein the provisioning installation comprises at least one of an operating system and a set of applications.

5. The method of claim 1, wherein the reverse automatic installation file contains instructions for recreating the contents of at least one system installation on at least one file system, and wherein the reverse automatic installation file comprises a reverse kickstart file.

6. The method of claim 1, wherein the set of nodes comprises at least one of a set of servers, a set of hosts, and a set of targets.

7. A network management platform, comprising:
    an interface to a network comprising a set of nodes; and a network management engine, communicating with the set of nodes via the interface, the network management engine to:

access a dependency map for the set of nodes on the network, the dependency map encoding a dependency relationship between programs installed on nodes in the set of nodes, access a separate associated reverse automatic installation file for each node in the set of nodes represented in the dependency map, each reverse automatic installation file encoding data host on each respective node, generate, via a provisioning server, a provisioning installation for each of the nodes from the separate associated reverse automatic installation file for each of the nodes, and validate a network restoration using a validation process performed via a network management platform.

8. The network management platform of claim 7, wherein the dependency map comprises a set of ordered links between nodes in the network based on a first set of software generating output or services used as inputs to a second set of software.

9. The network management platform of claim 7, wherein the network management engine is further configured to generate the dependency map by issuing a set of discovery commands.

10. The network management platform of claim 7, wherein the provisioning installation comprises at least one of an operating system and a set of applications.

11. The network management platform of claim 7, wherein the reverse automatic installation file contains instructions for recreating the contents of at least one system installation on at least one file system.

12. The network management platform of claim 7, wherein the set of nodes comprises at least one of a set of servers, a set of hosts, and a set of targets.

13. A non-transitory computer-readable storage medium storing instructions which, when executed, cause a processor to perform operations comprising:

accessing, by the processor, a dependency map for a set of nodes on the restored network, the dependency map encoding a dependency relationship between programs installed on nodes in the set of nodes;

accessing a separate associated reverse automatic installation file for each node in the set of nodes represented in the dependency map, the reverse automatic installation file encoding data hosted on each respective node;

generating, via a provisioning server, a provisioning installation for each of the nodes from the separate associated reverse automatic installation file for each of the nodes; and validating a network restoration using a validation process performed via a network management platform.

14. The non-transitory computer-readable storage medium of claim 13, wherein the dependency map comprises a set of ordered links between nodes in the network based on a first set of software generating output or services used as inputs to a second set of software.

15. The non-transitory computer-readable storage medium of claim 13, wherein the dependency map is generated via a network management platform issuing a set of discovery commands.

16. The non-transitory computer-readable storage medium of claim 13, wherein the provisioning installation comprises at least one of an operating system and a set of applications.

17. The non-transitory computer-readable storage medium of claim 13, wherein the reverse automatic installation file contains instructions for recreating the contents of at least one system installation on at least one file system.

18. The non-transitory computer-readable storage medium of claim 13, wherein the set of nodes comprises at least one of a set of servers, a set of hosts, and a set of targets.

* * * * *